United States Patent [19]

Dallmann et al.

[11] Patent Number: 4,746,703

[45] Date of Patent: May 24, 1988

[54] ORIENTED PLASTIC FILM HAVING SPECIFIC SURFACE TOPOGRAPHY

[75] Inventors: Hermann Dallmann; Walter Seifried, both of Wiesbaden; Werner Schaefer, Hofheim-Diedenbergen; Siegfried Janocha, Wiesbaden; Harmut Hensel, Schlangenbad, all of Fed. Rep. of Germany

[73] Assignee: Hoechst Aktiengesellschaft, Frankfurt am Main, Fed. Rep. of Germany

[21] Appl. No.: 817,214

[22] Filed: Jan. 8, 1986

[30] Foreign Application Priority Data

Jan. 15, 1985 [DE] Fed. Rep. of Germany ....... 3501017

[51] Int. Cl.$^4$ ............................................. C08L 67/02
[52] U.S. Cl. ..................... 525/176; 525/117; 525/118; 525/146; 525/148; 525/162; 525/165; 525/166; 525/438; 525/443; 428/423.7; 428/424.2; 428/447; 428/480; 428/910
[58] Field of Search ............... 525/176, 438, 445, 443, 525/165, 166, 146, 148

[56] References Cited

U.S. PATENT DOCUMENTS

| | | | |
|---|---|---|---|
| 4,089,828 | 5/1978 | Vasishth et al. | 260/29.6 TA |
| 4,104,261 | 8/1978 | Magosch et al. | 260/873 |
| 4,125,700 | 11/1979 | Graham | 204/159.16 |
| 4,139,518 | 2/1979 | Janocha et al. | 260/40 R |
| 4,143,094 | 3/1979 | Burzin et al. | 260/873 |
| 4,172,859 | 10/1979 | Epstein | 428/402 |
| 4,292,233 | 9/1981 | Binsack et al. | 260/40 R |
| 4,320,207 | 3/1982 | Watanabe et al. | 521/54 |
| 4,396,742 | 8/1983 | Binsack et al. | 525/64 |
| 4,417,026 | 11/1983 | Lindner et al. | 525/64 |
| 4,446,276 | 5/1984 | Binsack et al. | 525/64 |
| 4,568,616 | 2/1986 | Seifried et al. | 428/480 |

FOREIGN PATENT DOCUMENTS

| | | |
|---|---|---|
| 0030439 | 6/1981 | European Pat. Off. . |
| 0088634 | 9/1983 | European Pat. Off. . |
| 56-139551 | 10/1981 | Japan . |
| 2087302A | 5/1982 | United Kingdom . |

OTHER PUBLICATIONS

M. Woods et al, "Monodisperse Latices: I. Emulsion Polymerization with Mixtures of Anionic and Nonionic Surfactants," 40 *Proceedings of the Paint Research Institute* 541 (Dec. 1968).

G. Lohr, "The Determination of Particle Size Distribution of Aqueous Dispersions in the Submicroscopic Range by Aerosol Spectroscopy," 43 *Organic Coatings and Polymer Division* 420 (1980).

*Primary Examiner*—Theodore E. Pertilla
*Attorney, Agent, or Firm*—James C. Lydon

[57] ABSTRACT

This invention relates to a biaxially or multi-axially oriented, heat set film, which has on its surface numerous unevenesses, which comprise indentations around a protrusion. The protrusions comprise crosslinked or hardened organic particles having an average particle size of from 0.01 to 5.0 microns and having a narrow particle size distribution. The film surface has a mean surface roughness value Ra of from 0.005 to 0.10 micron.

7 Claims, 2 Drawing Sheets

ORIENTED PLASTIC FILM HAVING SPECIFIC SURFACE TOPOGRAPHY

BACKGROUND OF THE INVENTION

This invention relates to a biaxially or multi-axially oriented, heat set film made from thermoplastic materials; the surface of this film is uneven, having many fine protrusions with an indentation around each one.

Biaxially or multiaxially oriented polyester films, for example biaxially oriented polyethylene terephthalate film, have good tensile strength, tear resistance, modulus of elasticity, transparency, and chemical and thermal resistance. Due to these properties, polyester film has found wide use in a variety of applications, including video, audio, and computer film substrates, as well as in packaging and reprographic products.

Polyester films must meet specific requirements for various applications. One such requirement is a sufficiently low coefficient of friction on the film surface. The rougher the film surface is, the better is the winding behavior and therefore the production yield. In addition to a low coefficient of friction and good mechanical properties, a polyester film for magnetic tapes must additionally possess a uniform surface roughness, good abrasion resistance, and dimensional stability.

In order to give the normally smooth film surface a certain degree of roughness, fine particles are normally used; in the simplest case, these particles are lightly applied to the surface (powdering process). However, the particles can also be embedded in the surface, so that micro-fine, more or less irregular protrusions occur, as a result of which the previously smooth surface receives a certain roughness profile. Embedding particles in films made of thermoplastic material can be done according to two general methods: either insoluble, primarily inorganic, fine-particle materials are added to the polymers, or substances dissolved in the polymers, for example residues of the interesterification catalyst, are specifically precipitated. U.S. Pat. No. 4,139,518 even gives a method in which both methods are combined.

An excessively roughened polyester film surface will be unsuitable as a substrate for magnetic tape applications such as video tapes. Such applications also require the film substrate to possess good abrasion resistance and durability as well as a low coefficient of friction. Abrasion resistance, durability, and good electro-magnetic conversion properties are achieved by a relatively smooth, as opposed to roughened, film surface. In order to reconcile these contrasting properties, British Pat. No. 2,087,302 describes the film which contains inert additives or catalyst residues, as a result of which numerous uneven areas occur on the surface of the film, each of these uneven areas consisting of a small protrusion and the indentation around it.

The use of inorganic particles frequently results in the formation of voids at the places where the film matrix tears away from the particle grain during orientation. When the film is subsequently manufactured into magnetic tape by coating the film with a magnetic dispersion coating, portions of the polymer covering can loosen near the surface and abrade. The quality of the film coating, as well as its electro-magnetic properties, can be negatively affected in an uncontrolled manner. The more or less wide particle size distribution of inorganic particles, as well as their tendency to form agglomerates despite pains-staking preparation, also have negative effects on the film quality.

Furthermore, the formation of internal particles by precipitating residues of the interesterification catalyst cannot be precisely controlled with regard to the quantity and size of the precipitated particles.

West German Patent Application No. P 33 13 923.7 discloses the addition of fine-particle, primarily homodisperse, crosslinked acrylic particles to the film polymer to improve the abrasion resistance of the film. The acrylic particles possess a narrow particle size distribution and are prepared by an emulsion polymerization process. Due to their chemical composition, the particles are more strongly bound to the film matrix.

The object of this invention is to manufacture a film which has a good running and abrasion behavior and at the same time, when used as a base film for magnetic storage media, has outstanding electromagnetic conversion properties.

SUMMARY OF THE INVENTION

In one aspect, the present invention relates to a biaxially oriented, polyester film comprising a polyester matrix with from 0.005 to 5 percent by weight, based upon the total weight of said polyester film, of crosslinked organic particles having an average particle size range of from 0.01 to 5.0 microns, with a ratio of the weight average particle diameter and the number average particle diameter being 1.1 or less, said particles being substantially homogeneously dispersed throughout and covalently bonded to said polyester matrix, with at least one major surface of said polyester film having a mean surface roughness value Ra of from 0.005 to 0.10 microns, said major surface having a plurality of protrusions comprising said crosslinked organic particles, each surrounded by a depression.

In another aspect, the present invention relates to a process for the production of biaxially oriented polyester film comprising (i) extruding a polyester resin through a slot die, thereby forming a sheet-like extrudate, said polyester resin having from 0.005 to 5.0 percent by weight, based upon the total weight of said polyester resin, of crosslinked organic particles having an average particle size of from 0.01 to 5.0 microns, with the ratio of the weight average particle diameter and the number average particle diameter being 1.1 or less, said particles being homogeneously dispersed throughout and covalently bonded to said resin;

(ii) cooling said extrudate on a chill roll, thereby forming cast polyester sheet;

(iii) Preheating said cast polyester sheet by passing said cast polyester sheet past a heating device;

(iv) Subsequently biaxially orienting said cast polyester sheet at a temperature between the glass transition temperature of the film and 160° C.;

(v) Heat setting said cast polyester at a temperature of from 150° to 240° C.

DETAILED DESCRIPTION OF THE INVENTION

Figure 1:
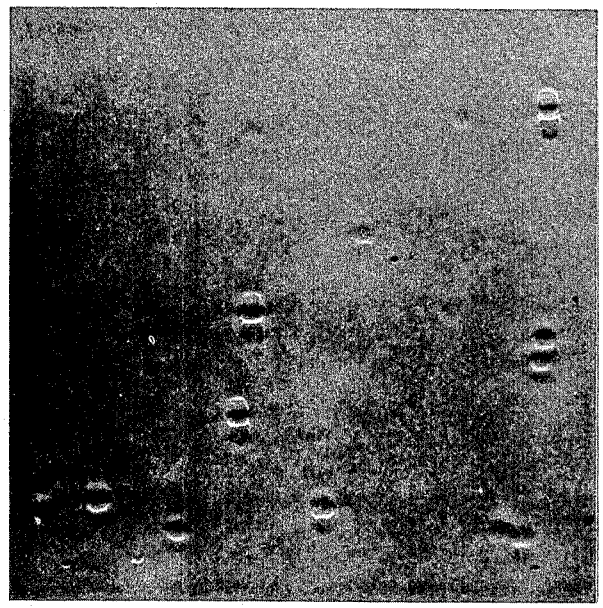
FIG. 1 is a photomicrograph of a polyester film surface, produced by the procedure illustrated in Example 1, which depicts the surface protrusions associated with the film of the present invention.

One of the distinguishing characteristics of the film summarized above is that it has surface protrusions which comprise crosslinked or hardened organic particles.

The hardened particles can comprise melamine/formaldehyde resin, benzoguanamine/formaldehyde resin or an epoxy resin. The crosslinked organic particles can contain as components unsaturated non-ionic monomers such as esters of acrylic and methacrylic acid such as methyl methacrylate and butyl acrylate, esters of unsaturated dicarboxylic acids such as maleic acid dialkyl ester, unsaturated vinyl compounds such as styrene, unsaturated nitriles such as acrylonitrile, functional monomers such as unsaturated carboxylic acids, hydroxyl-containing monomers such as hydroxyethyl methacrylate, monomers containing epoxide groups such as glycidyl methacrylate, unsaturated sulfonic acids, etc.

Examples of crosslinking agents include diallyl phthalate and divinyl benzene. Components which bear functional groups and which are polymerized in the particles for the purpose of forming covalent bonds between the polyester matrix and the crosslinked particles during the polyester synthesis include hydroxyethyl methacrylate, acrylic acid, and methacrylic acid.

The degree of hardening and crosslinking of the particles can be widely varied and adapted to requirements by varying the composition, especially of the hardening and crosslinking components. It is essential that the hardened or crosslinked particles not be soluble or meltable during the polymer synthesis and remain intact when the polymer is melted, especially in the manufacture of formed articles such as films, or during the reclaimation of waste film.

The particles can be manufactured by means of conventional emulsion or suspension polymerization. They can be added to the polymer matrix during the polymer manufacture, in the form of aqueous or glycol dispersions or in a concentrate. Addition during the polymer synthesis leads to a particularly good bonding in the matrix as well as to good distribution in the polymer itself.

The film contains the above-described particles in an amount between 0.005 and 5% by weight, preferably from 0.02 to 1% by weight, based upon the weight of the film. Either particles of uniform size or mixtures of particles with different sizes can be used.

The polymer particles are primarily spherical in form. The particles have an average diameter between 0.01 and 5.0 microns, preferably from 0.02 to 3 microns. The ratio of the weight average of the particle diameter ($D_w$) and the number average of the particle ($D_n$) must be 1.1 or less. For determining $D_w$ and $D_n$, see U. E. Wood, J. S. Dodge, I. M. Krieger, P. Pierce, *Journal of Paint Technology*, Vol. 40, No. 527, Page 545 (1968).

The film can be manufactured from various polymers, preferably from a thermoplastic polyester. Included in these polyester materials are polyester homo and copolymers, mixtures of various polyesters as well as mixtures and blends of polyesters with other polymers. The polyester can be manufactured either according to the interesterification process using the well-known catalysts such as, zinc, calcium, manganese, lithium and germanium salts, or using the direct esterification process. Examples of polyesters which can be used are polyethylene terephthalate, polytetramethylene terephthalate, poly-1,4-cyclohexylene dimethyl terephthalate, and polyethylene 2,6-naphthalate.

The copolyester can contain adipic acid, sebacic acid, phthalic acid, isophthalic acid, sulfoisophthalic acid, etc., as components. The polyesters manufactured using the interesterification process can contain so-called internal particles which are catalyst residue particles. Examples of polymers which can be added to the polyester include polyolefin homo or copolymers such as polypropylene, poly-4-methyl pentene, ethylene vinyl acetate copolymers, which in turn can be saponified, ionomers, polyamides, polycarbonates, and fluorine containing polymers.

Furthermore, the film can contain inorganic or organic additives, which have a positive effect on film properties such as static friction and kinetic friction, abrasion resistance, and running behavior. Examples of such additives include particles such as calcium carbonate, silicon dioxide, titanium dioxide, kaolin, fatty acid esters, polysiloxane, nucleating agents such as alkaline or alkaline-earth salts of ester waxes and/or partially saponified products of those, benzoates, and stearates.

The polymers and additives can be added in a concentrate using well known processes which need not be described in detail. As an alternative, they can be metered in during the manufacture of polyester.

A substantial disadvantage of the process for creating surface structures according to the current status of technology is that, using this manner of adjusting the particle size, a certain particle size range is unavoidable, with the accompanying problem of overlarge particles and agglomerate formation.

The decisive advantage of the present invention over current films and processes is that it begins with a polymer which contains fine-particle crosslinked or hardened polymer particles, which have a narrow particle size distribution, good affinity to the polymer, and which can be covalently bonded to the polymer by means of reactive groups.

The formation of voids during orientation in the first axial direction is almost completely eliminated by the use of particles having a narrow particle size distribution and which are covalently bonded to the polymer matrix. The creation of film surface structures is also considerably simplified. With the covalently embedded polymer particles, it is possible to specifically adjust the size, or MD diameter, of surface indentations, as well as their frequency, through the selection of particle size, concentration, heating and orientation conditions, and the like.

The surface roughness of the film can be determined more exactly than according to the current status of technology using the hardened or crosslinked particles, as a result of the frequency and size of the unevenesses as well as the height of the protrusions in the center of the indentations, which in turn are determined by the particle size, particle frequency, and process parameters.

The mean surface roughness of the film of the present invention lies in a range between average roughness values $R_a$ (DIN 4762) of 0.005 to 0.10 microns, preferably from 0.005 to 0.06 microns, with a cut-off of 0.25 mm.

The surface properties and surface roughnesses can be influenced by additional coating of the film with solutions or dispersions. These additional coatings can contain, among other things, crosslinkable, hardenable, hardened or crosslinked substances. Examples of this include copolyesters, polyurethanes, acrylic acid derivatives, polysiloxanes, styrene-butadiene rubbers, or already crosslinked or hardened substances, which can be present in the form of individual particles in the solutions or dispersions. The additional coatings can be applied in-line, i.e. between or prior to the draw stages, as well as off-line, that is after the film has been completely manufactured.

The film of this invention is manufactured according to the extrusion process. More specifically, a polymer, preferably a polyester, which contains hardened or crosslinked organic particles of the type described above, is extruded out of a slot die onto a cool roll, which can have a surface temperature T from 20° to 60° C. This film is subjected to a specific pre-heating, preferably at a temperature above Tg (glass transition temperature) for example using an IR-emitter, and is then oriented both in the MD and TD-directions at temperatures between the glass transition point of the polymers and 160° C., and at a draw ratio of preferably 2.0 to 6. The biaxially oriented film is then heat set at temperatures between 150° and 240° C. The number and sequence of the MD and TD draw stages is not predetermined. The individual machine direction (MD) and transverse direction (TD) draw processes can be done in one or several stages. Simultaneous orientation processes (simultaneous MD and TD drawing) are also possible.

The films with the surface structures can have equal properties in both directions (balanced types) or higher strength in one direction. The F-5 values should lie in a range from 50 to 300 N/mm², preferably from 90 to 250 N/mm². The expression "F-5-Value" means the tensile stress as a result of a 5% elongation.

Between the individual orientation stages or before heat setting, the films can be subjected to calendering at temperatures above the glass transition point of the polymers and with a roll pressure between 1,000 and 10,000 N/cm.

Before the first orientation or between the orientation stages, the film can be briefly treated at room temperature or at temperatures up to 50° C. with an organic solvent such as methanol, ethanol, etc.

The films manufactured with hardened or crosslinked particles can have the protrusions and indentations on one or both surfaces. A film with protrusions and indentations on only one side can be manufactured by heating the film on one side before or between the draw stages, or by coextrusion. Using coextrusion, a multiple layer film is obtained, which has only one layer near the surface having the crosslinked or hardened particles. Coextrusion also offers the possibility of using various thermoplastics. As a result of this, it is possible, among other things, to improve the adhesion to subsequently applied coatings by the selection of copolymers. Examples of this type of copolymer are copolyesters, a polyester modified with sulfoisophthalic acid-sodium salt, polyester containing phospholane, etc.

Films made according to this invention can be used as magnetic tape base films, for reprographic and photographic purposes, and in the packaging sector.

EXAMPLES

The following examples illustrate the practice and advantage of the present invention. As examples, they are illustrative only and are not intended to describe the full scope of the invention.

In the following Examples, a polyester polymer is used which contains finely divided, crosslinked acrylic particles, which have a narrow particle size distribution and which are manufactured by emulsion polymerization. The acrylic particles were added during the manufacture of the polyester, by means of dispersions into the polymer.

The abrasion behavior of the films was determined using a measurement unit in which a 12.5 mm wide film band with a constant tension (1N) is first drawn across a cleaning roll made of special rubber to remove any external contamination, then is drawn across a stationary deflection pin from a cassette, then is pulled over two rubber rolls which serve as measurement rolls and finally wound up. The abraded material remaining on the rubber rolls is evaluated according to a measurement scale from 1 to 5, or very good to inferior.

EXAMPLE 1

Polyethylene terephthalate, which contained 1000 ppm of a crosslinked organic particle comprising 80 parts by weight of methyl methacrylate, 20 parts by weight of butyl acrylate, 5 parts by weight of hydroxymethyl acrylate and 2.5 parts by weight of divinyl benzene with an average particle diameter of 0.65 micron, was melted at 280° C., formed into a film using a T-die, and cast on a casting drum having a temperature of approximately 40° C. The cooled cast film was conducted past an IR-emitter at approximately 10 m/min and subsequently biaxially drawn in a step-by-step process, whereby the draw temperature in the machine direction was 95° C. and in the transverse direction was 110° C. The surface draw ratio λ was 3.6×3.4. The film was then heat set at 195° C. in a tenter. The film obtained had an overall thickness of 12 microns, was of the balanced type, and on both surfaces had structures which consisted of indentations around protrusions. Structures of this type are shown in FIG. 1.

EXAMPLE 2

Figure 2:
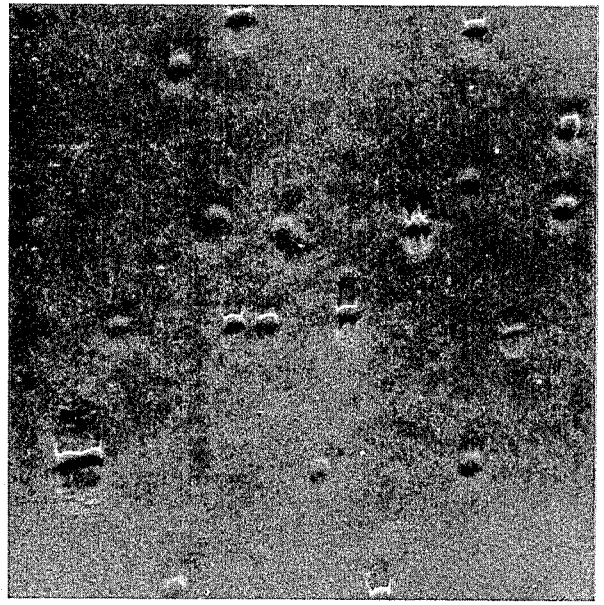
FIG. 2 is a photomicrograph of a polyester film surface, produced by the procedure illustrated in Example 2, which depicts the surface protrusions associated with the film of the present invention.

A film from the polymer described in Example 1 was conducted past such an IR-emitter system at a speed of 15 m/min, so that its temperature was 81° C. It was then drawn at 95° C. and a draw ratio of λ=3.4 in the machine direction. After a pre-heat time of 15 seconds, the uniaxially oriented film was then drawn in the transverse direction in a draw tenter by a factor of 2.5, and at a draw temperature of 110° C. The biaxially oriented film was then heat set in a heat set tenter at 198° C. The film had structures on both surfaces consisting of long indentations around protrusions. Structures of this type are shown in FIG. 2. The abrasion behavior of the film was good.

EXAMPLE 3

Figure 3:
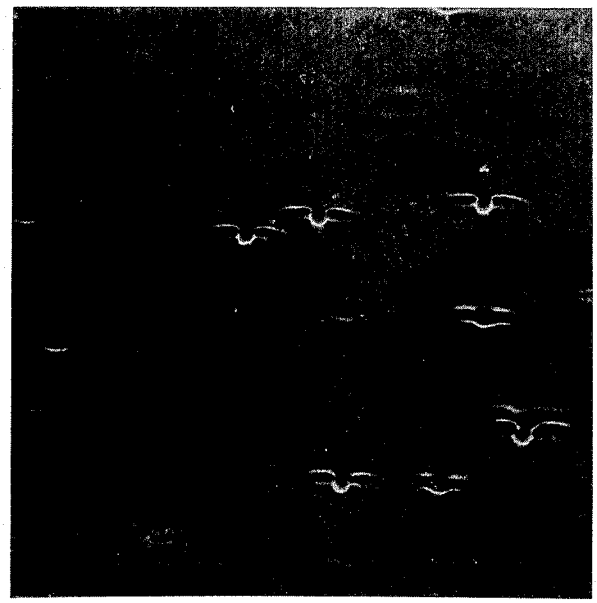
FIG. 3 is a photomicrograph of a polyester film surface, produced by the procedure illustrated in Example 3, which depicts the surface protrusions associated with the films of the present invention.
Figure 4:
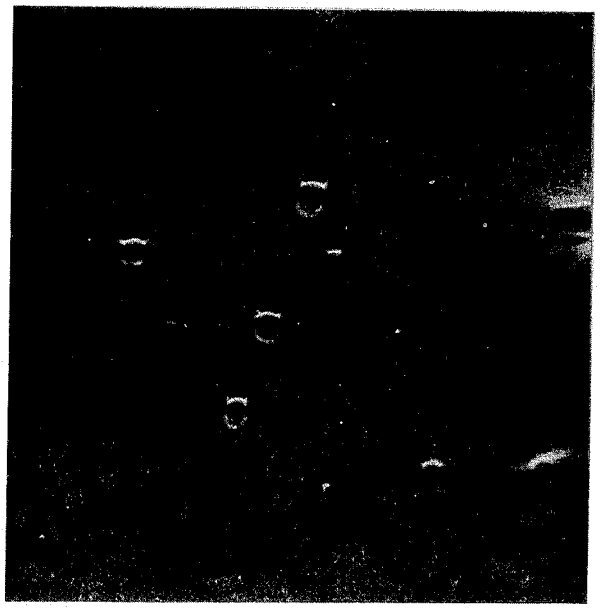
FIG. 4 is a photomicrograph of a polyester film surface, produced by the procedure illustrated in Example 3, which depicts surface protrusions not associated with the present invention.

A polyethylene terephthalate polymer, which contained 500 ppm of crosslinked organic particles of a composition as described in Example 1 as well as 0.4% by weight (related to the weight of the polymer) of sodium montanate, was melted, formed into a film using a slot die, and extruded onto a high gloss polished roll. The film obtained in this manner was heated to 80° C. before the first draw stage, and subsequently biaxially drawn, whereby a surface draw ratio of λ=13 was achieved. The biaxially oriented film was heat set at 195° C. The film had indentations around the polymer particles, on both surfaces. Examples of such structures are shown in FIGS. 3 and 4. Their abrasion resistance, which was tested as described above, was very good.

EXAMPLE 4

A polyester polymer which was completely free of particles, and a polyester polymer which contained 1000 ppm of the crosslinked organic particle of Example 1, were melted in separate extruders and, after passing through an adapter to which an extrusion die system was attached, were extruded onto a cool roll.

The film obtained in this way was conducted past an infra-red emitter system at a speed of approximately 10 m/min, with the particle-filled side exposed to the emitter. The film was then biaxially drawn in a step-by-step process and heat set at 195° C. The 14.5 microns thick, biaxially oriented film had a 1 micron thick layer of the particle-filled polyester. The surface of this particle-filled layer had structures as described in the above examples. The roughness values of the two film surfaces were 0.005 micron on the smooth side and 0.015 micron on the rough side with surface structures, expressed in $R_a$ according to DIN 4762. The coefficient of friction (measured according to DIN 53375) of the rough side was 0.35.

We claim:

1. A biaxially oriented polyester film comprising a polyester matrix with from 0.005 to 5 percent by weight, based upon the total weight of said polyester film, of crosslinked organic particles having an average particle size range of from 0.001 to 5.0 microns, with a ratio of the weight average particle diameter to the number average particle diameter of 1.1 or less, said particles being substantially homogeneously dispersed throughout and covalently bonded to said polyester matrix, with at least one major surface of said polyester film having a mean surface roughness value Ra of from 0.005 to 0.10 micron, said major surface having a plurality of protrusions comprising said crosslinked organic particles, each surrounded by a depression, said film produced by a sequential melt extrusion, cooling, orientation, and crystallization process in which polyester cast sheet is heated to a temperature above its glass transition temperature after the cooling step and prior to the orientation step.

2. The film of claim 1 wherein the polyester matrix contains from 0.02 to 1.0 percent, based upon the total weight of said film, of crosslinked organic particles.

3. The film of claim 1 wherein said crosslinked organic particles have an average particle diameter of from 0.02 to 3.0 microns.

4. The film of claim 1 wherein said polyester matrix is polyethylene terephthalate.

5. The film of claim 1 wherein said mean surface roughness value Ra ranges from 0.005 to 0.06 micron.

6. The film of claim 1 further comprising a second adhesion-promoting film layer which has been coextruded with said polyester matrix.

7. The film of claim 6 wherein said second film layer has a different chemical composition than said polyester matrix.

* * * * *